(No Model.)
W. C. AGNEW.
HORSE COLLAR.
No. 491,065. Patented Feb. 7, 1893.
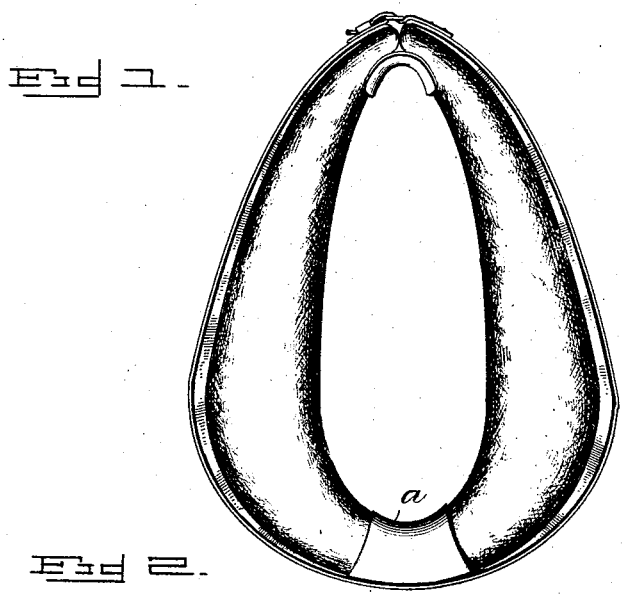
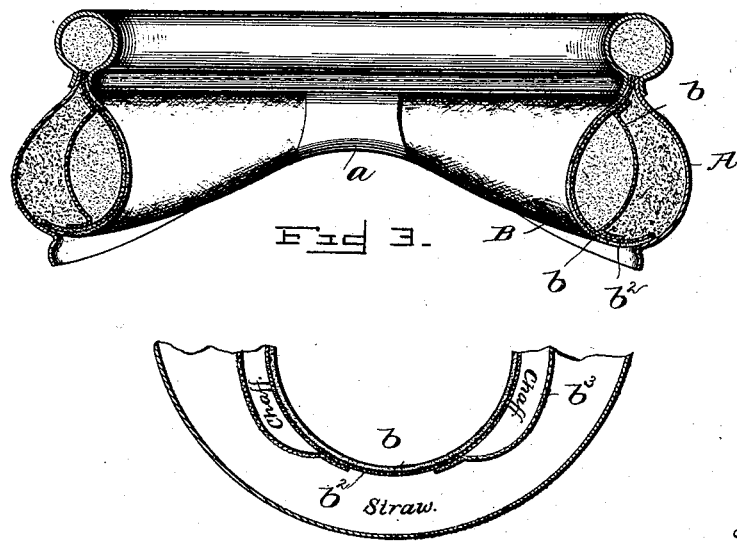
Witnesses
Paul W. Stevens
David H. Mead
Inventor
William C. Agnew,
By R. S. Dyrenforth
his Attorney

UNITED STATES PATENT OFFICE.

WILLIAM C. AGNEW, OF CRESTON, ILLINOIS.

HORSE-COLLAR.

SPECIFICATION forming part of Letters Patent No. 491,065, dated February 7, 1893.

Application filed March 17, 1892. Serial No. 425,315. (No model.)

*To all whom it may concern:*

Be it known that I, WILLIAM C. AGNEW, a citizen of the United States, residing at Creston, in the county of Ogle and State of Illinois, have invented certain new and useful Improvements in Horse-Collars; and I do hereby declare the following to be a full, clear, and exact description of the invention, such as will enable others skilled in the art to which it appertains to make and use the same.

This invention relates to horse collars.

The object of the invention is to produce a horse collar which shall be strong and durable and of such construction that those parts coming in contact with the animal will readily conform to the shape of its shoulders and neck insuring a perfect fit, after a short use of the collar and thus prevent chafing or rubbing of the animal.

The object of the invention is furthermore to produce a horse collar of such construction that those parts coming in contact with the animal will readily conform to the shape of its shoulders and neck, and at the same time will be prevented from becoming distorted by use.

The object of the invention is furthermore, to produce a horse collar in which these portions coming in contact with the animal shall be sufficiently absorbent to take up any sweat which may be present, thus avoiding injury to the skin of the animal.

With these objects in view the invention consists in a horse collar composed generally of a covering and a filling of straw, and corn chaff, the chaff being placed near the surfaces which in use come in contact with the animal, the covering of the chaff being preferably porous.

The invention consists furthermore in a horse collar composed of a covering and a filling of straw and corn chaff, the chaff being placed in that part which in use comes in contact with the animal, the covering of that part of the collar containing the chaff being composed of an outer layer of felt and an inner layer of canvas or the like, the two layers being stitched together.

The invention is illustrated in the accompanying drawings in which

Figure 1—is an elevation of a collar constructed in accordance with my invention; Fig. 2—is a transverse section of the collar, and Fig. 3—is a section through the center of the collar, the section being taken at right angles to that shown in Fig. 2.

In the drawings, A represents the main portion of the collar, being the outer face and the throat which is provided with a covering $a$ of leather, canvas or other suitable material. The greater part of the collar is filled with straw which is tightly packed into the collar in the usual way. The inner portion B of the collar, or that part which bears against the shoulders of the animal, is filled with some soft absorbent material, and for this purpose I prefer to use corn chaff for the reason that the substance is very cheap and by reason of its absorbent qualities is particularly adapted for the purpose. That portion of the collar containing the corn chaff is covered with a soft substance such as felt, in order to avoid injury to the animal by constant contact with it, and being porous, tends to absorb moisture arising on the animal and to convey this to the inner filling of corn chaff.

To prevent injurious stretching of the felt covering marked $b$ in the drawings, and keep the same from losing its shape, an inner lining $b^2$ of canvas or some other rigid and preferably porous material is stitched to the rear face of the felt and serves to retain the same in proper form.

Attached to the inner face of the lining $b^2$ is a second piece of canvas or the like $b^3$, between which, and the lining, the corn chaff is confined, and separated from the straw with which the main portion of the collar is filled.

Having thus fully described my invention, what I claim as new and desire to secure by Letters Patent, is:—

1. A horse-collar having its body stuffed with corn-chaff and straw, those portions coming in contact with the animal being filled with the corn-chaff and covered with felt, and a partition arranged within the body of the collar, and separating the corn-chaff from the straw, substantially as described.

2. A horse-collar having its body stuffed with corn-chaff and straw, those portions coming in contact with the animal being filled with the corn-chaff and covered with felt, to which is attached a lining of canvas or the like, and a partition arranged within the body of the collar and separating the corn-chaff from the other portion of the filling, substantially as described.

In testimony whereof I affix my signature in presence of two witnesses.

WILLIAM C. AGNEW.

Witnesses:
H. C. ROBBINS,
CHARLES E. ADAMS.